United States Patent
Son

(10) Patent No.: US 12,513,616 B2
(45) Date of Patent: Dec. 30, 2025

(54) ETHERNET PHYSICAL LAYER TRANSCEIVER FOR SLEEP MODE TRANSMISSION AND COMMUNICATION DEVICE INCLUDING THE SAME

(71) Applicant: Samsung Electronics Co., Ltd., Suwon-si (KR)

(72) Inventor: Jung Kwun Son, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 638 days.

(21) Appl. No.: 17/732,916

(22) Filed: Apr. 29, 2022

(65) Prior Publication Data

US 2023/0066508 A1 Mar. 2, 2023

(30) Foreign Application Priority Data

Aug. 25, 2021 (KR) .................. 10-2021-0112154

(51) Int. Cl.
*H04W 52/02* (2009.01)
*H04L 61/5014* (2022.01)

(52) U.S. Cl.
CPC .......... *H04W 52/02* (2013.01); *H04L 61/5014* (2022.05)

(58) Field of Classification Search
CPC ........... H04L 61/5014; H04L 61/5007; H04W 80/04; H04W 8/26; H04W 52/02; H04W 52/00; H04W 52/0209; H04W 52/0212; H04W 52/0222; H04W 88/16; H04W 76/25
See application file for complete search history.

(56) References Cited

U.S. PATENT DOCUMENTS

| | | | |
|---|---|---|---|
| 8,955,089 B2 | 2/2015 | Shatsky | |
| 9,588,562 B2 | 3/2017 | Guichard et al. | |
| 9,918,276 B2 | 3/2018 | Fiennes | |
| 10,757,653 B2 | 8/2020 | Fiennes | |
| 10,849,074 B2 | 11/2020 | Lee et al. | |
| 10,887,402 B2 | 1/2021 | Ho | |
| 2005/0097378 A1* | 5/2005 | Hwang | G06F 1/3209 713/320 |
| 2006/0271739 A1* | 11/2006 | Tsai | G06F 3/0611 711/123 |
| 2011/0188394 A1* | 8/2011 | Seo | H04L 61/5014 370/252 |
| 2014/0092418 A1 | 4/2014 | Kishimoto | |
| 2015/0286271 A1* | 10/2015 | Vrind | G06F 1/329 713/323 |
| 2016/0218406 A1* | 7/2016 | Sanford | H01P 1/208 |
| 2016/0242116 A1* | 8/2016 | Masuda | H04W 16/32 |
| 2019/0297574 A1 | 9/2019 | Choi et al. | |
| 2021/0345248 A1* | 11/2021 | Xue | H04L 1/0035 |
| 2023/0198940 A1* | 6/2023 | Zhao | H04L 1/1887 |

FOREIGN PATENT DOCUMENTS

| | | |
|---|---|---|
| KR | 101890659 B1 | 9/2018 |
| KR | 20210001740 A | 1/2021 |

* cited by examiner

*Primary Examiner* — Allahyar Kasraian
(74) *Attorney, Agent, or Firm* — Harness, Dickey & Pierce, P.L.C.

(57) ABSTRACT

An Ethernet physical layer transceiver and a communication device are provided. The Ethernet physical layer transceiver includes processing circuitry configured to transmit a Dynamic Host Configuration Protocol (DHCP) request packet to a server after entering a sleep mode.

14 Claims, 10 Drawing Sheets

FIG. 10

| DA | | | ... | | Magic_cookie | Option_num | Option_len | Option_msgtype |

FIG. 11

| Value | Message Type |
|---|---|
| 1 | DHCPDISCOVER |
| 2 | DHCPOFFER |
| 3 | DHCPREQUEST |
| 4 | DHCPDECLINE |
| 5 | DHCPACK |
| 6 | DHCPNCK |
| 7 | DHCPRELEASE |

ETHERNET PHYSICAL LAYER TRANSCEIVER FOR SLEEP MODE TRANSMISSION AND COMMUNICATION DEVICE INCLUDING THE SAME

CROSS-REFERENCE TO RELATED APPLICATION

This application claims priority to Korean Patent Application No. 10-2021-0112154, filed on Aug. 25, 2021, and all the benefits accruing therefrom under 35 U.S.C. § 119, the disclosure of which is incorporated herein by reference in its entirety.

BACKGROUND

1. Field

The present disclosure relates to an Ethernet physical layer transceiver and a communication device including the same.

2. Description of the Related Art

In general, a communication device transmits keep-alive messages at intervals of a fixed period, or a period determined based on a period determining algorithm, in order to maintain its Internet protocol (IP) access. For example, when the fixed period is 10 minutes long, the communication device may transmit keep-alive messages to a server every 10 minutes.

The transmission of keep-alive messages at intervals of a predetermined amount of time, or an amount of time determined based on the period determining algorithm, may be suitable for receiving data in real time.

However, in implementations in which data is not received in real time, the periodic transmission of keep-alive messages may be wasteful in terms of resources.

Also, if an entire communication system is driven to transmit keep-alive messages, the power consumption of the communication system may increase. However, when keep-alive messages are not being used, the cost of transmitting data packets may increase, and as a result, network resources being used by the communication system may increase.

SUMMARY

Embodiments of the inventive concepts provide for appropriate use of keep-alive messages. Embodiments of the present disclosure provide an Ethernet physical layer transceiver capable of reducing power consumption by maintaining an Internet protocol (IP) address allocated thereto, simply with the use of a physical layer.

Embodiments of the present disclosure also provide a communication device capable of reducing power consumption by maintaining an IP address allocated thereto, simply with the use of a physical layer. However, embodiments of the present disclosure are not restricted to those set forth herein. Embodiments of the present disclosure will become more apparent to one of ordinary skill in the art to which the present disclosure pertains by referencing the detailed description of the present disclosure given below.

According to embodiments of the present disclosure, there is provided an Ethernet physical layer transceiver comprising processing circuitry configured to transmit a Dynamic Host Configuration Protocol (DHCP) request packet to a server after entering a sleep mode.

According to embodiments of the present disclosure, there is provided a communication device comprising an Ethernet physical layer transceiver configured to communicate packet data with a server, a central processing unit (CPU) configured to control communication of the packet data, and an interface configured to transfer the packet data between the Ethernet physical layer transceiver and the CPU, wherein the Ethernet physical layer transceiver includes processing circuitry configured to transmit a Dynamic Host Configuration Protocol (DHCP) request packet to the server after entering a sleep mode.

According to embodiments of the present disclosure, there is provided a communication device comprising a central processing unit (CPU) configured to control communication of first packet data with a server in a normal mode, and an Ethernet physical layer transceiver configured to control communication of second packet data with the server in a sleep mode, the CPU entering an idle state during the sleep mode.

Other features and embodiments may be apparent from the following detailed description, the drawings, and the claims.

BRIEF DESCRIPTION OF THE DRAWINGS

Embodiments and features of the present disclosure will become more apparent by describing in detail examples thereof with reference to the attached drawings, in which:

FIG. 10 illustrates a DHCP packet.

FIG. 11 is a table showing various option message types of DHCP packets.

DETAILED DESCRIPTION

Figure 1:
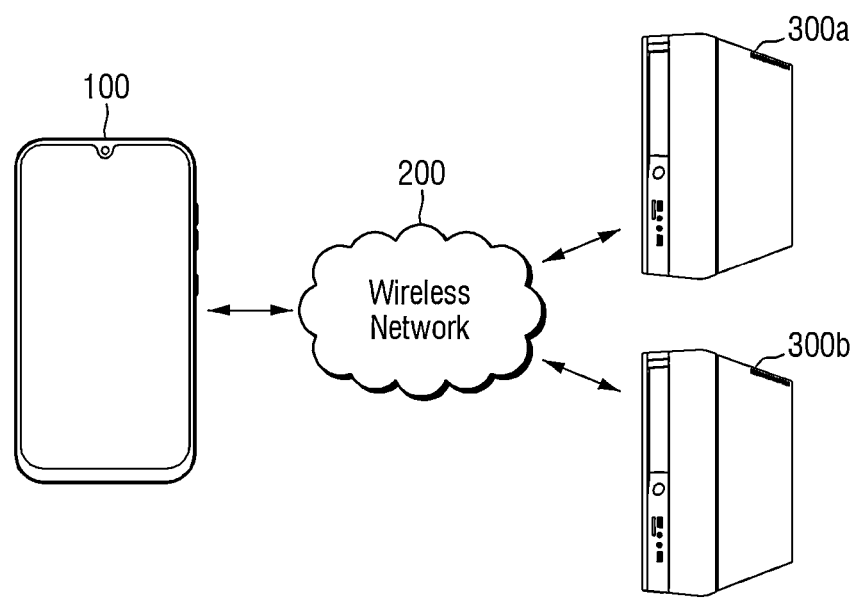
FIG. 1 illustrates a communication system according to embodiments of the present disclosure.

FIG. 1 illustrates a communication system according to embodiments of the present disclosure.

Referring to FIG. 1, a communication system 1 may include a communication device 100 and one or more servers (300a and/or 300b) connected by a wireless network 200.

The number of servers (e.g., a first server 300a and a second server 300b) is not particularly limited. By way of example, the communication system 1 will be discussed as including two servers (300a and 300b).

The communication device 100 may be implemented in various forms such as a mobile phone, a tablet personal computer (PC), a digital camera, a camcorder, a laptop computer, a desktop computer, an electronic book (e-book) reader, a digital broadcast terminal, a personal digital assistant (PDA), a portable multimedia player (PMP), a navigation device, an MP3 player, and/or a wearable device. Also, the communication device 100 may be a household appliance such as a refrigerator, an air purifier, etc. Also, the communication device 100 may be a stationary electronic device at a fixed location, a mobile electronic device that may be carried around, or may be a digital broadcast receiver capable of receiving digital broadcasts.

The communication device 100 may transmit data to, or receive data from, at least one of the servers (300a and 300b) via the wireless network 200. The wireless network 200 may be implemented as at least one of a wired communication network or a wireless communication network.

For example, the wireless network 200 may be a mobile communication network (such as a Wireless Broadband (WiBro) network, a World Interoperability for Microwave Access (WiMAX) network, a code-division multiple access (CDMA) network, a wideband CDMA (WCDMA) network, a third generation (3G) network, a fourth generation (4G) network, a fifth generation (5G) network, etc.), a short-range communication network (such as a near field communication (NFC) network, a Bluetooth network, a wireless local area network (WLAN), a WiFi network, etc.), a wired Ethernet, an infrared (IR) network, a Bluetooth Low Energy (BLE) network, an ultrasonic network, a ZigBee network, a high-definition multimedia interface (HDMI) network, and/or a low-power long-range communication network (such as a television white space (TVWS) network or a Weightless network).

The communication system 1 where the communication device 100 is connected to the servers (300a and 300b) at a remote location via the wireless network 200 using Transmission Control Protocol/Internet Protocol (TCP/IP) will hereinafter be described.

The wireless network 200 may receive various requests from the communication device 100 and may transmit the received requests to the servers (300a and 300b). Also, the wireless network 200 may transmit responses received from the servers (300a and 300b) to the communication device 100.

For example, the servers (300a and 300b) may transmit a Quality-of-Service (QoS) interval to the communication device 100 via the wireless network 200.

The QoS interval, which refers to the interval at which the communication device 100 maintains its IP access, may be stored in advance in the servers (300a and 300b) to satisfy the QoS of the communication device 100.

The communication device 100 and the servers (300a and 300b) may exchange "keep alive"-associated messages with one another via the wireless network 200 using the QoS interval. The "keep alive"-associated messages may be messages for the communication device 100 to maintain its IP access to the servers (300a and 300b).

The power consumption of the communication device 100 may increase during the exchange of the "keep alive"-associated messages between the communication device 100 and the servers (300a and 300b).

The exchange of the "keep alive"-associated messages between the communication device 100 and the servers (300a and 300b) will hereinafter be described with reference to FIG. 2.

Figure 2:
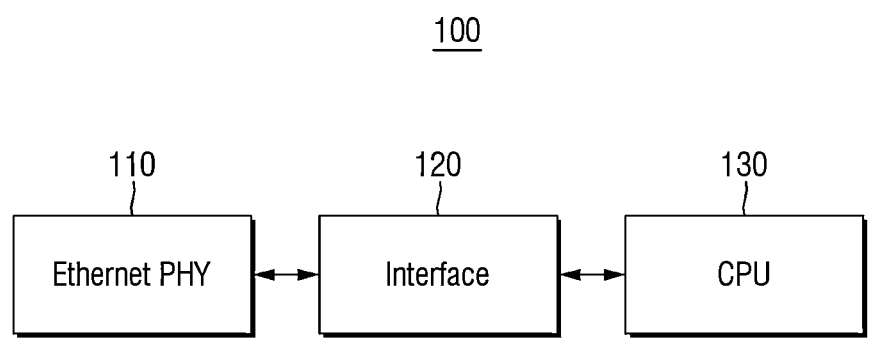
FIG. 2 is a block diagram of a communication device according to embodiments of the present disclosure.

FIG. 2 is a block diagram of a communication device according to embodiments of the present disclosure.

Referring to FIGS. 1 and 2, the communication device 100 may include an Ethernet physical layer transceiver ("Ethernet PHY") 110, an interface 120, and/or a central processing unit (CPU) 130.

The CPU 130 may control the operation of the communication device 100 in accordance with TCP/IP. For example, the CPU 130 may control the transmission of packet data between the communication device 100 and the servers (300a and 300b).

The interface 120 may assist the transmission of data between the Ethernet physical layer transceiver 110 and the CPU 130.

The interface 120 may be, for example, a Media Independent Interface (MII), a Reduced MII (RMII), a Gigabit MII (GMII), a Reduced GMII (RGMII), a Serial GMII (SGMII), and/or a 10-Gigabit MII (XGMII), but the type of the interface 120 is not particularly limited.

The Ethernet physical layer transceiver 110 may exchange data (e.g., packet data) with the servers (300a and 300b), only using the Ethernet physical layer in a computer network.

Conventionally, during the exchange of the "keep alive"-associated messages between the communication device 100 and the servers (300a and 300b), the Ethernet physical layer transceiver 110, the interface 120, and the CPU 130 may all operate.

However, according to embodiments, the communication device 100 may reduce its power consumption by maintaining IP addresses allocated thereto from the servers (300a and 300b), only using the Ethernet physical layer transceiver 110.

Specifically, the Ethernet physical layer transceiver 110 may transmit request packets (e.g., Dynamic Host Configuration Protocol (DHCP) request packets) to the servers (300a and 300b) and may thus maintain the IP addresses allocated to the communication device 100.

Accordingly, the interface 120 and the CPU 130 of the communication device 100 may enter an idle state and may stop operating (or reduce operations), and as a result, the power consumption of the communication device 100 may be reduced.

That is, when the communication device 100 enters a sleep mode, only the Ethernet physical layer transceiver 110 may be driven to maintain the IP addresses allocated to the communication device 100, and the other elements of the communication device 100 (e.g., the interface 120 and the CPU 130) may be set to the idle state. In this manner, the power consumption of the communication device 100 may be minimized or reduced.

It will hereinafter be described how to maintain the IP addresses allocated to the communication device 100, using the Ethernet physical layer transceiver 110, when the communication device 100 enters the sleep mode.

Figure 3:
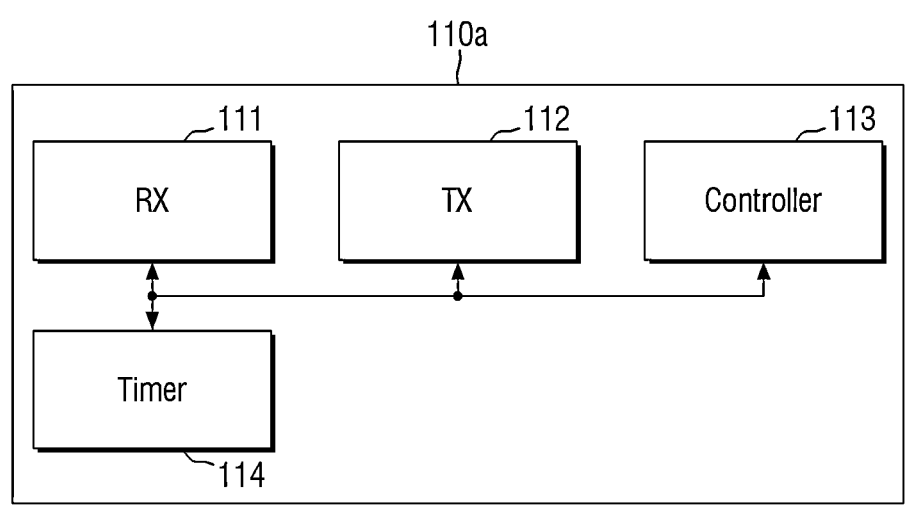
FIG. 3 is a block diagram of an Ethernet physical layer transceiver according to embodiments of the present disclosure.

FIG. 3 is a block diagram of an Ethernet physical layer transceiver according to embodiments of the present disclosure.

Referring to FIGS. 1 through 3, an Ethernet physical layer transceiver 110a may include a receiver ("RX") 111, a transmitter ("TX") 112, a controller 113, and/or a timer 114.

The receiver 111 may receive data (e.g., packet data) from the outside (e.g., from an outside source, such as one or more of the servers (300a and/or 300b)).

The transmitter 112 may transmit data (e.g., packet data) to the outside (e.g., to the outside source, such as the one or more of the servers (300a and/or 300b)).

The controller 113 may control the general operation of the Ethernet physical layer transceiver 110a. For example, the controller 113 may control the transmission of data (e.g., packet data) between the Ethernet physical layer transceiver 110a and the outside (e.g., the outside source, such as the one or more of the servers (300a and/or 300b)).

The timer 114 may set a predetermined or alternatively, given period (e.g., a QoS interval) such that the communication device 100 may transmit request data (e.g., request packets) to the outside (e.g., the outside source, such as the one or more of the servers (300a and/or 300b)) at intervals of the predetermined or alternatively, given period.

It will hereinafter be described in further detail how to maintain the IP addresses allocated to the communication device 100, using the Ethernet physical layer transceiver 110, when the communication device 100 enters the sleep mode.

Figure 4:
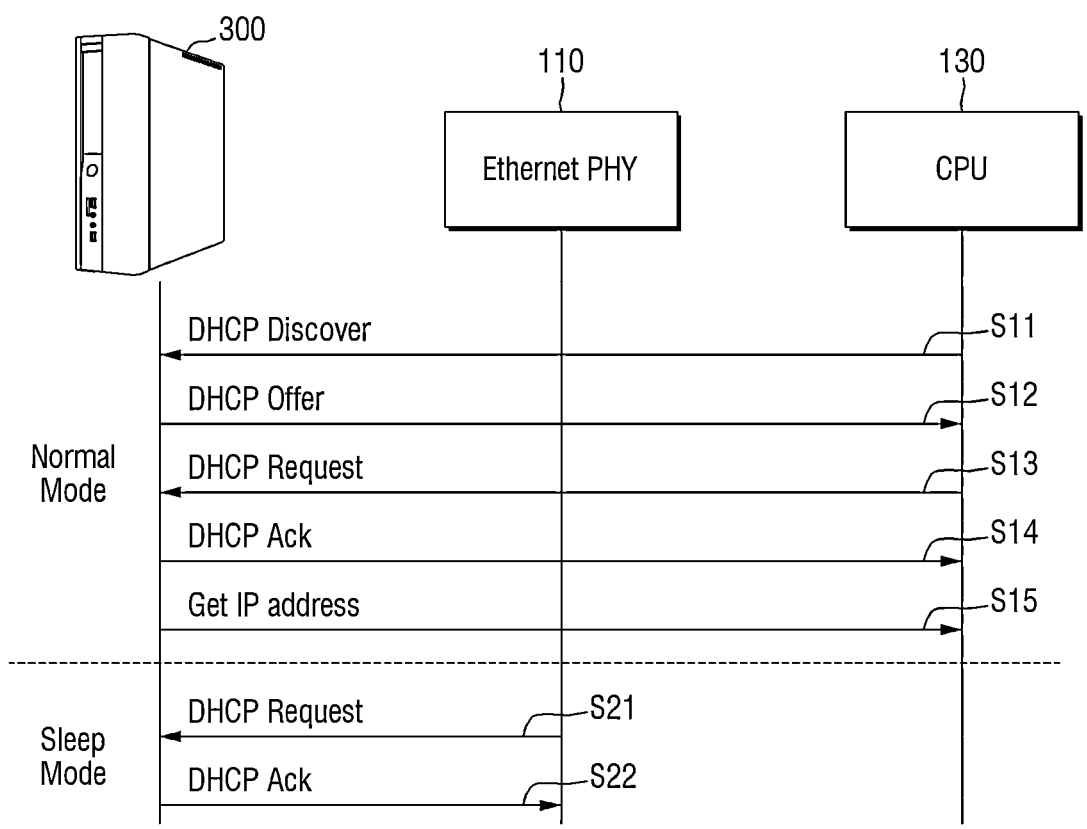
FIG. 4 is a ladder diagram illustrating a communication method according to embodiments of the present disclosure.

FIG. 4 is a ladder diagram illustrating a communication method according to embodiments of the present disclosure.

Referring to FIGS. 1 through 4, the communication device 100 may receive an IP address from a server 300 via the CPU 130 while operating in a normal mode. According to embodiments, the server 300 may correspond to one of the first server 300a or the second server 300b illustrated in FIG. 1.

Specifically, the CPU 130 may discover DHCP from the server 300 in the normal mode (S11). According to embodiments, operation S11 may include transmitting (e.g., broadcasting), by the CPU 130, a message indicating a request for an IP address. Thereafter, the server 300 may offer DHCP to the CPU 130 (S12). According to embodiments, operation S12 may include receiving, by the CPU 130, an offer message (e.g., a message including an offered IP address) from the server 300 (e.g., in response to the message broadcasted in operation S11). Thereafter, the CPU 130 may transmit a DHCP request to the server 300 (S13). According to embodiments, the DHCP request may include an indication that the CPU 130 requests the offered IP address). Thereafter, the server 300 may transmit a DHCP acknowledgement packet to the CPU 130 (S14). Thereafter, the server 300 may allocate an IP address to the CPU 130 (S15).

While these processes (e.g., operations S10-S15) are being performed in the normal mode, the elements of the communication device 100 (e.g., the interface 120 and the CPU 130) may all operate.

Thereafter, when the communication device 100 enters the sleep mode (e.g., the communication device 100 transitions to the sleep mode from the normal mode), the interface 120 and the CPU 130 of the communication device 100 may enter the idle state. To maintain the IP address allocated to the communication device 100, the Ethernet physical layer transceiver 110 may transmit a DHCP request packet to the server 300 (S21). According to embodiments, the Ethernet physical layer transceiver 110 may periodically transmit the DHCP request packet to the server 300 according to a time period obtained using the timer 114. Thereafter, the server 300 may transmit a DHCP acknowledgement packet to the Ethernet physical layer transceiver 110 (S22). That is, the power consumption of the communication device 100 may be minimized or reduced by maintaining the IP address allocated to the communication device 100, only using the Ethernet physical layer transceiver 110, without the aid of the interface 120 and the CPU 130.

The communication method according to embodiments of the present disclosure will hereinafter be described in further detail with reference to FIG. 5.

Figure 5:
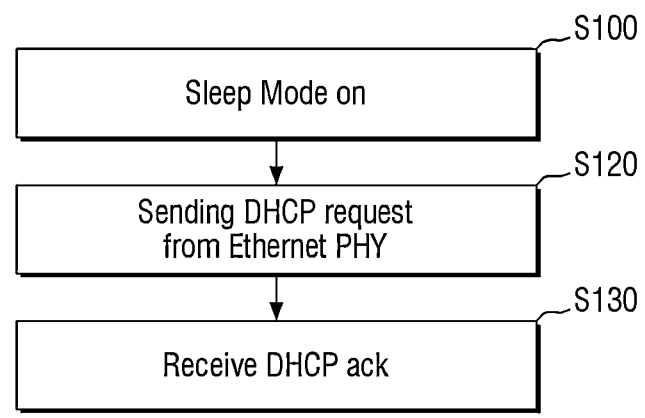
FIG. 5 is a flowchart illustrating the communication method according to embodiments of the present disclosure.

FIG. 5 is a flowchart illustrating the communication method according to embodiments of the present disclosure.

Referring to FIGS. 1 through 5, the communication device 100 may enter the sleep mode (S100). Thereafter, the Ethernet physical layer transceiver 110 may transmit a DHCP request packet to the server 300 (S120). Thereafter, the server 300 may transmit a DHCP acknowledgement packet to the Ethernet physical layer transceiver 110 (S130). That is, the power consumption of the communication device 100 may be minimized or reduced by maintaining the IP address allocated to the communication device 100, only using the Ethernet physical layer transceiver 110, without the aid of the interface 120 and the CPU 130.

Figure 6:
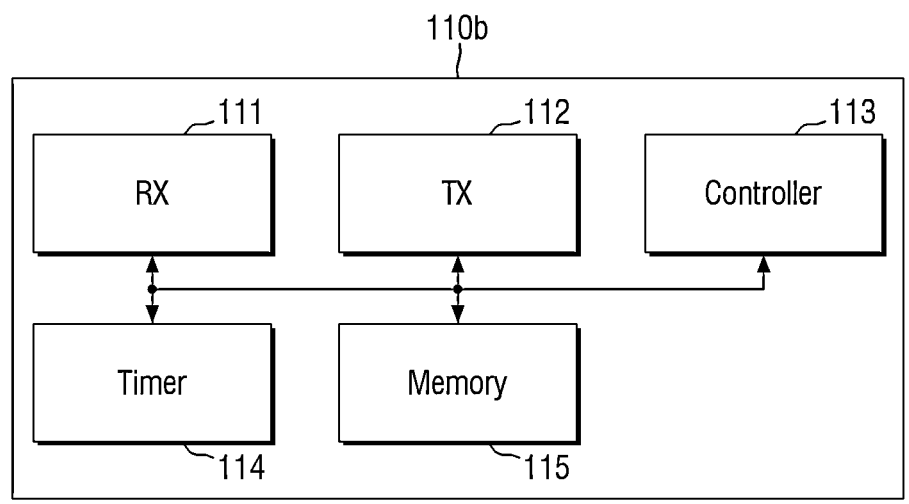
FIG. 6 is a block diagram of an Ethernet physical layer transceiver according to embodiments of the present disclosure.

FIG. 6 is a block diagram of an Ethernet physical layer transceiver according to embodiments of the present disclosure.

Referring to FIGS. 1, 2, and 6, an Ethernet physical layer transceiver 110b may include the receiver ("RX") 111, the transmitter ("TX") 112, the controller 113, the timer 114, and/or a memory 115. Descriptions of elements or features that have already been described above may be omitted.

The memory 115 may store some of packet data transmitted between the Ethernet physical layer transceiver 110b and one or more of the servers (300a and/or 300b) in the normal mode.

For example, some of the packet data transmitted between the Ethernet physical layer transceiver 110b and one or more of the servers (300a and/or 300b) in the normal mode may be transmitted to the memory 115 before the normal mode is off or before the sleep mode is on.

The memory 115 may be, for example, a register, but the present disclosure is not limited thereto. Alternatively or additionally, the memory 115 may be a cache memory. Alternatively or additionally, the memory 115 may include at least one storage medium such as a flash memory, a hard disk, a MultiMedia Card (MMC), a card-type memory (e.g., a secure digital (SD) card, a Micro SD (microSD), an xD card, etc.), a random-access memory (RAM), a static RAM (SRAM), a read-only memory (ROM), an electrically erasable programmable ROM (EEPROM), a programmable ROM (PROM), a magnetic memory, a magnetic disk, and/or an optical disk.

A communication method according to embodiments of the present disclosure will hereinafter be described with reference to FIG. 7.

Figure 7:
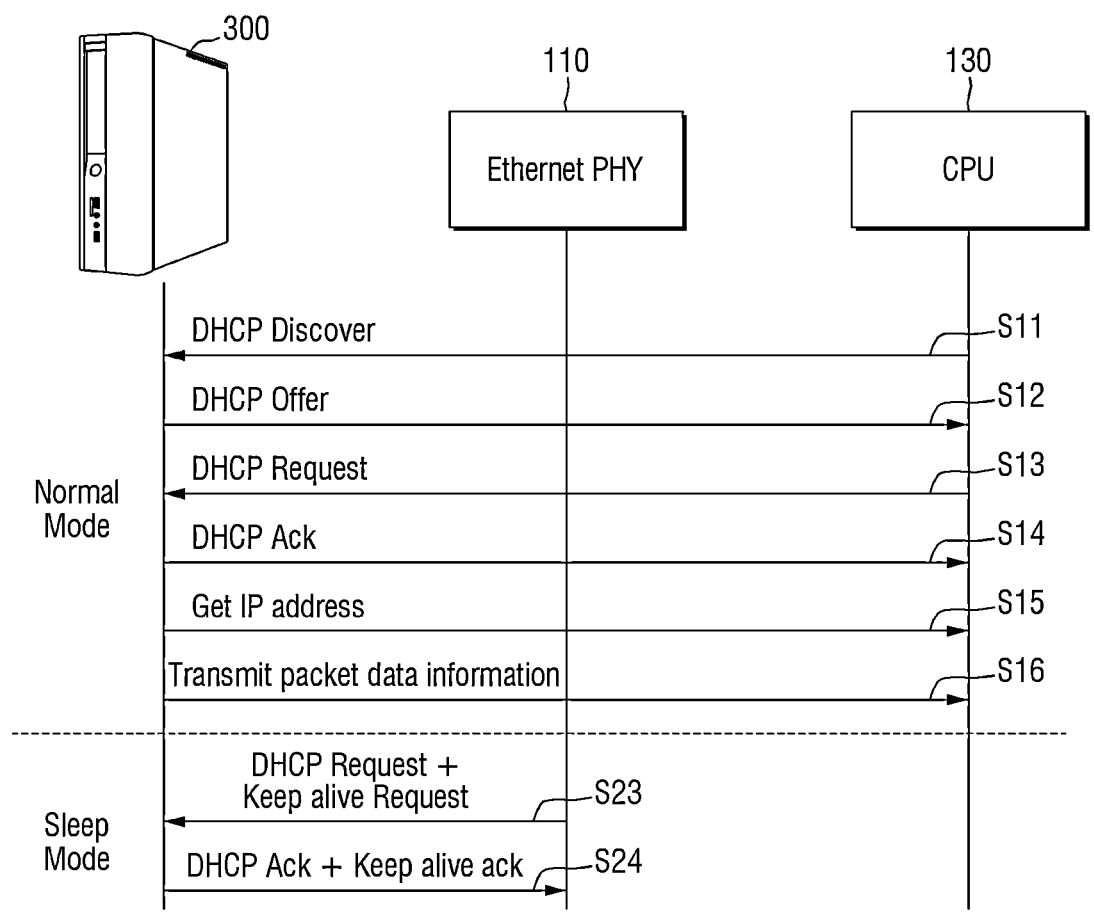
FIG. 7 is a ladder diagram illustrating a communication method according to embodiments of the present disclosure.

FIG. 7 is a ladder diagram illustrating a communication method according to embodiments of the present disclosure.

Descriptions of elements or features that have already been described above with reference to FIG. 4 may be omitted.

Referring to FIGS. 1, 2, 6, and 7, some of packet data transmitted between one or more of the servers (300a and/or 300b) and the communication device 100 during the normal mode may be transmitted to the Ethernet physical layer transceiver 110 (S16) before the normal mode is off or the sleep mode is on.

Thereafter, when the communication device 100 enters the sleep mode, the interface 120 and the CPU 130 of the communication device 100 may enter the idle state. To maintain the IP address allocated to the communication device 100, the Ethernet physical layer transceiver 110 (e.g., 110b) may transmit a keep-alive request to the server 300 together with a DHCP request packet (S23). Thereafter, the server 300 may transmit a DHCP acknowledgement packet and a keep-alive acknowledgement packet to the Ethernet physical layer transceiver 110 (e.g., 110b) (S24). That is, the power consumption of the communication device 100 may be minimized or reduced by maintaining the IP address allocated to the communication device 100, only using the Ethernet physical layer transceiver 110 or 100b, without the aid of the interface 120 and the CPU 130.

A communication method according to embodiments of the present disclosure will hereinafter be described with reference to FIG. 8.

Figure 8:
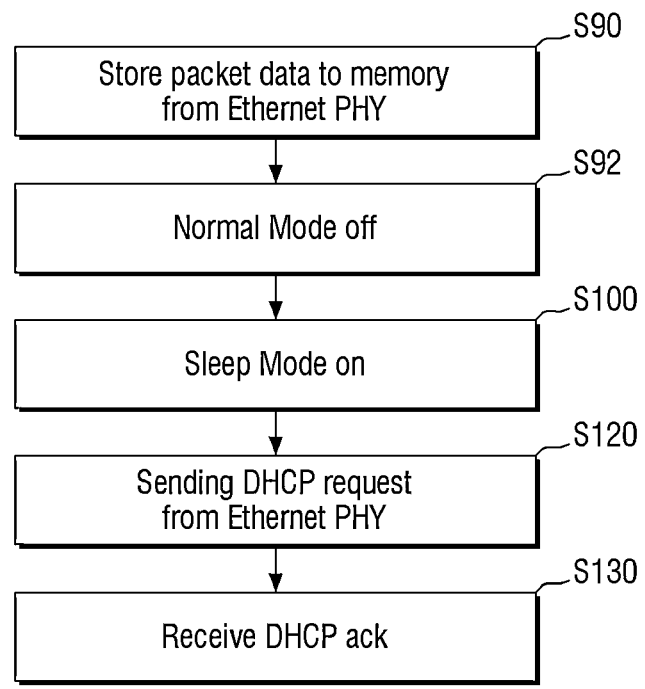
FIG. 8 is a flowchart illustrating a communication method according to embodiments of the present disclosure.

FIG. 8 is a flowchart illustrating a communication method according to embodiments of the present disclosure.

Descriptions of elements or features that have already been described above with reference to FIG. 4 will be omitted.

Referring to FIGS. 1, 2, and 6 through 8, some of packet data transmitted between one or more of the servers (300a and/or 300b) and the communication device 100 during the normal mode may be transmitted to the Ethernet physical layer transceiver 110 (S90) before the normal mode is off or the sleep mode is on. According to embodiments, operation S90 may also include storing the packet data to the memory 115. Thereafter, the normal mode is off (e.g., the communication device 100 transitions from the normal mode to the sleep mode) (S92). Operations following S92 (e.g., operations S100 through S130) may be the same as (or similar to) their respective counterparts of FIG. 5, and thus, descriptions thereof may be omitted.

The Ethernet physical layer transceiver 110 may determine whether to maintain the sleep mode or switch to the normal mode by inspecting a DHCP acknowledgement packet received in S22 of FIG. 4, S130 of FIG. 5, S24 of FIG. 7, and/or S130 of FIG. 8.

It will hereinafter be described how the Ethernet physical layer transceiver 110 may inspect a DHCP acknowledgement packet.

Figure 9:
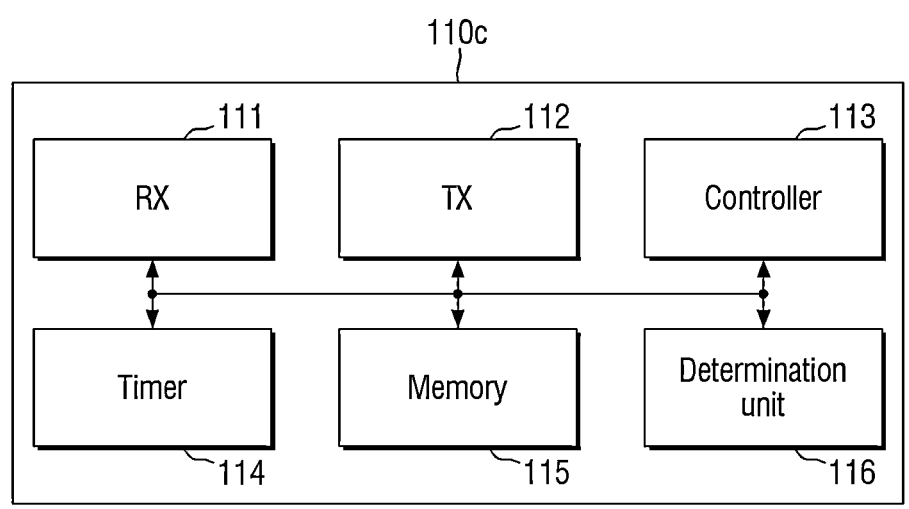
FIG. 9 is a block diagram of an Ethernet physical layer transceiver according to embodiments of the present disclosure.

FIG. 9 is a block diagram of an Ethernet physical layer transceiver according to embodiments of the present disclosure.

Referring to FIGS. 1, 2, and 9, and the Ethernet physical layer transceiver 110b depicted in FIG. 6, an Ethernet physical layer transceiver 110c may further include a determination unit 116.

The determination unit 116 may determines whether a DHCP acknowledgement packet received from the outside (e.g., an external device such as one of more of the servers (300a and/or 300b)) is normal.

The operation of the determination unit 116, e.g., how the determination unit 116 determines whether the DHCP acknowledgement packet received from the outside (e.g., an external device such as one or more of the servers (300a and/or 300b)) is normal, will hereinafter be described.

FIG. 10 illustrates a DHCP packet.

Referring to FIGS. 1, 2, 9, and 10, the DHCP packet includes a destination address DA, a magic cookie Magic_cookie, an option number Option_num, an option length Option_len, and/or an option message type Option_msgtype.

The type of information included in the DHCP packet is not particularly limited.

The destination address DA refers to the address of a target client (e.g., the communication device 100) to which the DHCP packet has been transmitted by, for example, one or more of the servers (300a and/or 300b).

The magic cookie Magic_cookie may have zero to four bytes.

The option number Option_num and the option length Option_len may include information regarding the magic cookie Magic_cookie. The option number Option_num may have a length of 1 byte, and the option length Option_len may also have a length of 1 byte.

The option message type Option_msgtype may include message type information of the DHCP packet. The option message type Option_msgtype may have a length of 284 bytes.

Examples of the option message type Option_msgtype are as shown in FIG. 11.

FIG. 11 is a table showing various option message types of DHCP packets.

Referring to FIGS. 10 and 11, the option message type of the DHCP packet may vary depending on the value of the option message type Option_msgtype, which ranges from 1 to 7.

For example, if the option message type Option_msgtype has a value of 1, the DHCP packet may be a DHCP discover packet "DHCPDISCOVER", if the option message type Option_msgtype has a value of 2, the DHCP packet may be a DHCP offer packet "DHCPOFFER", if the option message type Option_msgtype has a value of 3, the DHCP packet may be a DHCP request packet "DHCPREQUEST", if the option message type Option_msgtype has a value of 4, the DHCP packet may be a DHCP decline packet "DHCPDECLINE", if the option message type Option_msgtype has a value of 5, the DHCP packet may be a DHCP acknowledgement packet "DHCPACK", if the option message type Option_msgtype has a value of 6, the DHCP packet may be a DHCP acknowledgement decline packet "DHCPNCK", and/or if the option message type Option_msgtype has a value of 7, the DHCP packet may be a DHCP release packet "DHCPRELEASE".

Referring again to FIGS. 1, 2, 9, and 10, the determination unit 116 may determine whether the DHCP packet received from the outside (e.g., from an external device such as one or more of the servers (300a and/or 300b)) is a normal DHCP acknowledgement packet based on the destination address DA, the magic cookie Magic_cookie, and the option message type Option_msgtype of the received DHCP packet, and this will hereinafter be described with reference to FIG. 12.

Figure 12:
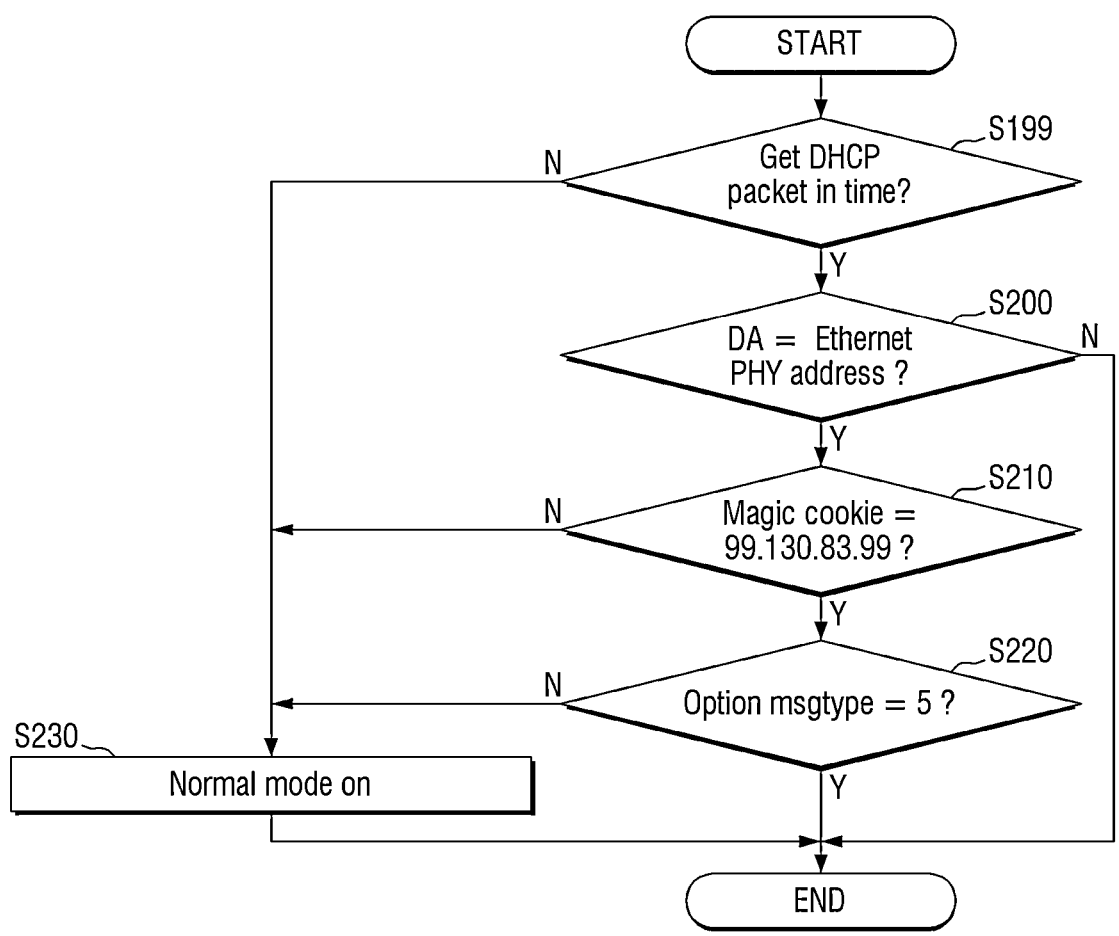
FIG. 12 is a flowchart illustrating how to determine whether a DHCP acknowledgement packet is normal.

FIG. 12 is a flowchart illustrating how to determine whether a DHCP acknowledgement packet is normal.

Referring to FIGS. 1, 2, 6, 9, 10, and 12, the Ethernet physical layer transceiver 110 may determine whether a DHCP packet received from the outside (e.g., from an external device such as one or more of the servers (300a and/or 300b)) has arrived within a predetermined or alternatively, given time window (S199). The predetermined or alternatively, given time window may be set by the timer 114.

If a determination is made that the received DHCP packet has not arrived within the predetermined or alternatively, given time window (N), a client (e.g., the communication device 100) may switch to the normal mode (e.g., transition from the sleep mode to the normal mode) (S230). According to embodiments, the determination unit 116 may notify the controller 113 that the received DHCP packet is not a normal DHCP acknowledgement packet.

If a determination is made that the received DHCP packet has arrived within the predetermined or alternatively, given time window (Y), the Ethernet physical layer transceiver 110 may determine whether the destination address DA of the received DHCP packet is the same as (or similar to) the address of the client (e.g., the address of the Ethernet physical layer transceiver 110 and/or the communication device 100) (S200).

If a determination is made that the destination address DA of the received DHCP packet is not the same as (or similar to) the address of the client (e.g., the address of the Ethernet physical layer transceiver 110 and/or the communication device 100) (N), the determination unit 116 may maintain the client (e.g., the Ethernet physical layer transceiver 110 and/or the communication device 100) on standby (e.g., sleep mode).

On the contrary, if a determination is made that the destination address DA of the received DHCP packet is the same as (or similar to) the address of the client (e.g., the address of the Ethernet physical layer transceiver 110 and/or the communication device 100) (Y), the determination unit 116 may determine whether the magic cookie Magic_cookie of the received DHCP packet is 99.130.83.99 (S210).

If the magic cookie Magic_cookie of the received DHCP packet is not 99.130.83.99 (N), the determination unit 116 may notify the controller 113 that the received DHCP packet is not a normal DHCP acknowledgement packet, and switch the client (e.g., the communication device 100) to the normal mode (e.g., transition from the sleep mode to the normal mode) (S230).

On the contrary, if the magic cookie Magic_cookie of the received DHCP packet is 99.130.83.99 (Y), the determination unit 116 may determine whether the option message type Option_msgtype of the received DHCP packet is 5 (S220).

If the option message type Option_msgtype of the received DHCP packet is not 5 (N), the determination unit 116 may notify the controller 113 that the received DHCP packet is not a normal DHCP acknowledgement packet, and switch the client (e.g., the communication device 100) to the normal mode (e.g., transition from the sleep mode to the normal mode) (S230).

On the contrary, if the option message type Option_msgtype of the received DHCP packet is 5 (Y), the determination unit 116 may determine that the received DHCP packet is a normal DHCP acknowledgement packet destined for (e.g., addressed to) the client (e.g., the Ethernet physical layer transceiver 110 and/or the communication device 100), maintain the client (e.g., the communication device 100) in the sleep mode, and periodically transmit a DHCP request packet to the outside (e.g., to an external device such as one or more of the servers (300*a* and/or 300*b*) at intervals of a predetermined or alternatively, given period set by the timer 114. According to embodiments, after transitioning from the sleep mode to the normal mode, the communication device 100 may generate and communicate packet data (e.g., TCP/IP signals) with the server 300 using the CPU 130, the interface 120 and/or the Ethernet physical layer transceiver 110 (e.g., using the IP address maintained during the sleep mode).

Figure 13:
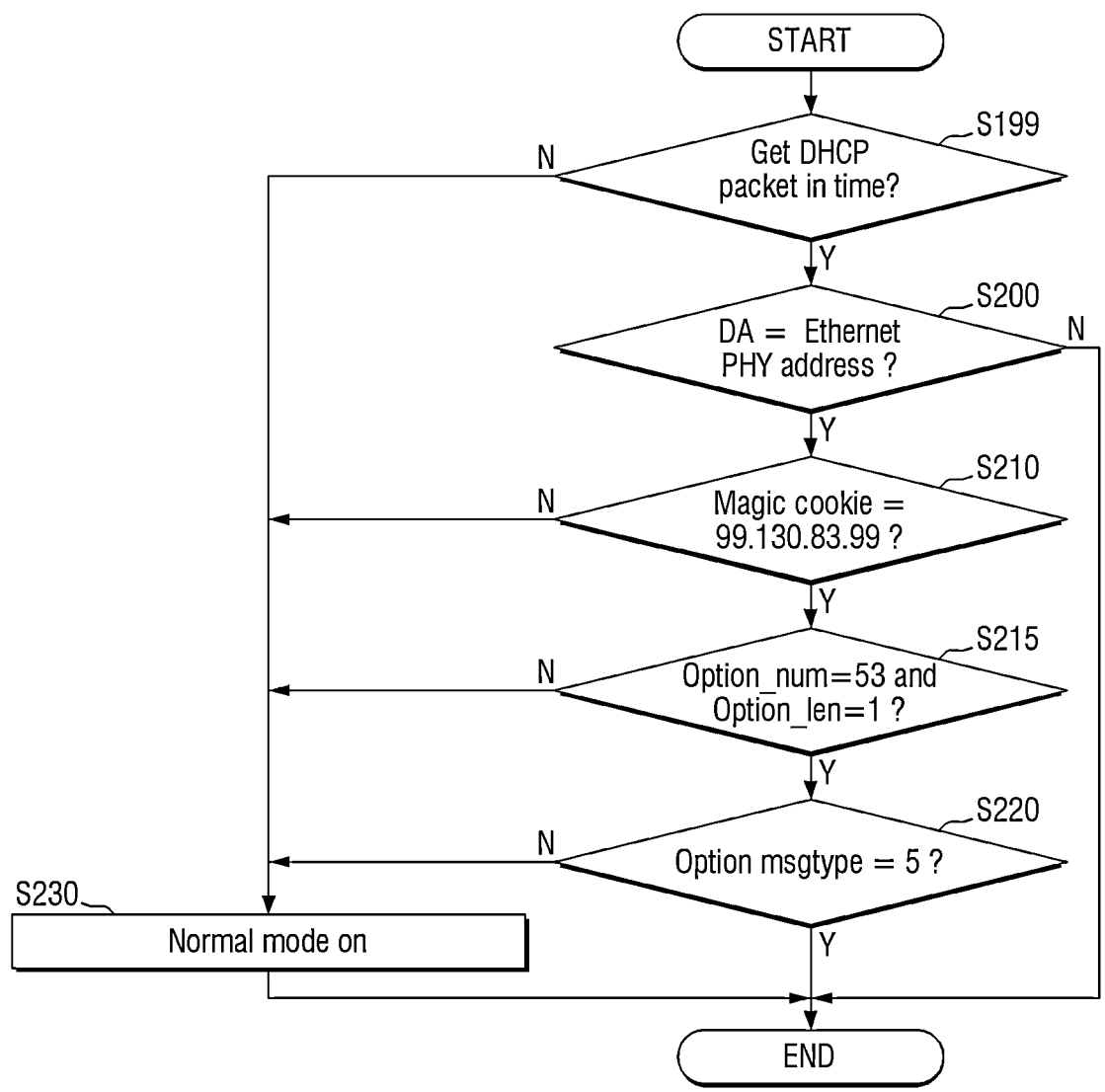
FIG. 13 is a flowchart illustrating how to determine whether a DHCP acknowledgement packet is normal.

Referring again to FIGS. 1, 2, 6, 9, and 10, the determination unit 116 may determine whether a DHCP packet received from the outside (e.g., an external device such as one or more of the servers (300*a* and/or 300*b*)) is a normal DHCP acknowledgement packet based on the destination address DA, the magic cookie Magic cookie, the option number Option_num, the option length Option_len, and/or the option message type Option_msgtype of the received DHCP packet, and this will hereinafter be described with reference to FIG. 13.

FIG. 13 is a flowchart illustrating how to determine whether a DHCP acknowledgement packet is normal.

Referring to FIGS. 1, 2, 9, 10, and 13, the Ethernet physical layer transceiver 110 may determine whether a DHCP packet received from the outside (e.g., from an external device such as one or more of the servers (300*a* and/or 300*b*)) has arrived within a predetermined or alternatively, given time window (S199). The predetermined or alternatively, given time window may be set by the timer 114.

If a determination is made that the received DHCP packet has not arrived within the predetermined or alternatively, given time window (N), the client (e.g., the communication device 100) may switch to the normal mode (e.g., transition from the sleep mode to the normal mode) (S230). According to embodiments, the determination unit 116 may notify the controller 113 that the received DHCP packet is not a normal DHCP acknowledgement packet.

If a determination is made that the received DHCP packet has arrived within the predetermined or alternatively, given time window (Y), the Ethernet physical layer transceiver 110 may determine whether the destination address DA of the received DHCP packet is the same as (or similar to) the address of the client (e.g., the address of the Ethernet physical layer transceiver 110 and/or the communication device 100) (S200).

If a determination is made that the destination address DA of the received DHCP packet is not the same as (or similar to) the address of the client (e.g., the address of the Ethernet physical layer transceiver 110 and/or the communication device 100) (N), the determination unit 116 may maintain the client (e.g., the Ethernet physical layer transceiver 110 and/or the communication device 100) on standby (e.g., sleep mode).

On the contrary, if a determination is made that the destination address DA of the received DHCP packet is the same as (or similar to) the address of the client (e.g., the address of the Ethernet physical layer transceiver 110 and/or the communication device 100) (Y), the determination unit 116 may determine whether the magic cookie Magic_cookie of the received DHCP packet is 99.130.83.99 (S210).

If the magic cookie Magic_cookie of the received DHCP packet is not 99.130.83.99 (N), the determination unit 116 may notify the controller 113 that the received DHCP packet is not a normal DHCP acknowledgement packet, and switches the client (e.g., the communication device 100) to the normal mode (e.g., transition from the sleep mode to the normal mode) (S230).

On the contrary, if the magic cookie Magic_cookie of the received DHCP packet is 99.130.83.99 (Y), the determination unit 116 may determine whether the option number Option_num and the option length Option_len of the received DHCP packet are 53 and 1, respectively (S215).

If the option number Option_num and the option length Option_len of the received DHCP packet are not 53 and 1, respectively (N), the determination unit 116 may notify the controller 113 that the received DHCP packet is not a normal DHCP acknowledgement packet, and switch the client (e.g., the communication device 100) to the normal mode (e.g., transition from the sleep mode to the normal mode) (S230).

On the contrary, if the option number Option_num and the option length Option_len of the received DHCP packet are 53 and 1, respectively (Y), the determination unit 116 may determine whether the option message type Option_msgtype of the received DHCP packet is 5 (S220).

If the option message type Option_msgtype of the received DHCP packet is not 5 (N), the determination unit 116 may notify the controller 113 that the received DHCP packet is not a normal DHCP acknowledgement packet, and switch the client (e.g., the communication device 100) to the normal mode (e.g., transition from the sleep mode to the normal mode) (S230).

On the contrary, if the option message type Option_msg-type of the received DHCP packet is 5 (Y), the determination unit 116 may determine that the received DHCP packet is a normal DHCP acknowledgement packet destined for the client (e.g., the Ethernet physical layer transceiver 110 and/or the communication device 100), maintain the client (e.g., the communication device 100) in the sleep mode, and periodically transmit a DHCP request packet to the outside (e.g., to an external device such as one or more of the servers (300a and/or 300b) at intervals of a predetermined or alternatively, given period set by the timer 114.

Referring again to FIGS. 1, 2, 9, and 10, the determination unit 116 may determine whether a DHCP packet received from the outside (e.g., an external device such as one or more of the servers (300a and/or 300b)) is a normal DHCP acknowledgement packet based on the destination address DA, the magic cookie Magic_cookie, the option number Option_num, the option length Option_len, and/or the option message type Option_msgtype of the received DHCP packet.

Conventional communication devices use a CPU, an Ethernet physical layer transceiver, and an interface therebetween to transmit keep-alive messages (e.g., TCP/IP signals) to a server in order to maintain an IP address allocated by the server while the conventional communication devices are in a sleep mode. The use of all of these components of the conventional communication devices to maintain the allocated IP address results in excessive resource consumption (e.g., power, processor, memory, etc.). This excessive resource consumption is worsened in situations in which the conventional communication devices are in sleep mode for extended periods (e.g., when real-time applications are not being implemented).

However, according to embodiments, improved communication devices are provided for maintaining an IP address allocated by the server while the improved communication devices are in a sleep mode. Specifically, the improved communication devices are able to perform communications (e.g., using physical layer signals) with the server using only the Ethernet physical layer transceiver (e.g., without using the CPU or the interface of the conventional communication devices) sufficient to maintain the allocated IP address while in the sleep mode. Accordingly, the improved communication devices overcome the deficiencies of the conventional communication devices to at least reduce resource consumption (e.g., power, processor, memory, etc.). For example, as the Ethernet physical layer is able to perform the communications using physical layer signals, the processing of higher layers of TCP/IP signals may be omitted while maintaining the IP address in the sleep mode.

According to embodiments, operations described herein as being performed by the communication system 1, the communication device 100, the first server 300a, the second server 300b, the server 300, the Ethernet physical layer transceiver 110, the interface 120, the CPU 130, the Ethernet physical layer transceiver 110a, the receiver 111, the transmitter 112, the controller 113, the timer 114, the Ethernet physical layer transceiver 110b, the Ethernet physical layer transceiver 110c and/or the determination unit 116 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory 115, etc.). A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments of the present disclosure have been described above with reference to the accompanying drawings, but the present disclosure is not limited thereto and may be implemented in various different forms. It will be understood that the present disclosure may be implemented in other specific forms without changing the technical spirit or gist of the present disclosure. Therefore, it should be understood that embodiments set forth herein are illustrative in all respects and not limiting.

What is claimed is:

1. A communication device comprising:
   an Ethernet physical layer transceiver configured to communicate packet data with a server;
   a central processing unit (CPU) configured to control communication of the packet data;
   an interface configured to transfer the packet data between the Ethernet physical layer transceiver and the CPU; and
   an element of the communication device different from the Ethernet physical layer transceiver, configured to enter an idle state during a sleep mode of the communication device,
   wherein the Ethernet physical layer transceiver includes processing circuitry configured to transmit a Dynamic Host Configuration Protocol (DHCP) request packet to the server after the communication device enters the sleep mode.

2. The communication device of claim 1, wherein
   the Ethernet physical layer transceiver includes a memory, and the processing circuitry is configured to store the packet data in the memory before the communication device enters the sleep mode.

3. The communication device of claim 2, wherein the memory is a register.

4. The communication device of claim 2, wherein the memory is a cache memory.

5. The communication device of claim 2, wherein the memory is a nonvolatile memory.

6. The communication device of claim 1, wherein the processing circuitry is configured to transmit a keep-alive request to the server after the communication device enters the sleep mode.

7. The communication device of claim 1, wherein the processing circuitry is configured to transmit the DHCP request packet to the server according to a time period.

8. The communication device of claim 1, wherein the Ethernet physical layer transceiver is configured to receive a DHCP acknowledgement packet during the sleep mode.

9. A communication device comprising:
a central processing unit (CPU) configured to control communication of first packet data with a server in a normal mode of the communication device; and
an Ethernet physical layer transceiver configured to control communication of second packet data with the server in a sleep mode of the communication device,
wherein the CPU is configured to enter an idle state during the sleep mode of the communication device.

10. The communication device of claim 9, wherein
the Ethernet physical layer transceiver includes a memory, and
the Ethernet physical layer transceiver is configured to store the first packet data in the memory before entering the sleep mode of the communication device.

11. The communication device of claim 10, wherein the memory is a register.

12. The communication device of claim 10, wherein the memory is a nonvolatile memory.

13. The communication device of claim 9, wherein the Ethernet physical layer transceiver is configured to transmit a keep-alive request to the server after entering the sleep mode of the communication device.

14. The communication device of claim 9, wherein
the Ethernet physical layer transceiver is configured to transmit the second packet data to the server according to a time period.

* * * * *